(12) United States Patent
Wang

(10) Patent No.: US 7,604,189 B2
(45) Date of Patent: Oct. 20, 2009

(54) ELECTRIC SEASONING MILL

(75) Inventor: Chih Hung Wang, Tainan Hsien (TW)

(73) Assignee: Duo Yeu Metal Co., Ltd., Yung Kang (TW)

( * ) Notice: Subject to any disclaimer, the term of this patent is extended or adjusted under 35 U.S.C. 154(b) by 448 days.

(21) Appl. No.: 11/560,209

(22) Filed: Nov. 15, 2006

(65) Prior Publication Data

US 2007/0221771 A1    Sep. 27, 2007

Related U.S. Application Data

(63) Continuation-in-part of application No. 11/385,807, filed on Mar. 22, 2006, now Pat. No. 7,380,737.

(51) Int. Cl.
*A47J 42/04* (2006.01)
(52) U.S. Cl. .................................... 241/169.1; 241/258
(58) Field of Classification Search ................. 241/168, 241/169.1, 169, 258
See application file for complete search history.

(56) References Cited

U.S. PATENT DOCUMENTS

| | | | |
|---|---|---|---|
| 3,734,417 A | 5/1973 | Russell | |
| 4,685,625 A | 8/1987 | Mazza | |
| 4,925,150 A | 5/1990 | Tedioli | |
| 5,022,591 A | 6/1991 | Sanders | |
| 6,491,244 B2 | 12/2002 | Pedersen | |
| 6,830,205 B2 | 12/2004 | Wang | |
| 6,830,206 B2 | 12/2004 | Yang | |
| 6,962,302 B2 | 11/2005 | Cheng | |
| 6,966,507 B2 | 11/2005 | Yang | |
| 6,966,510 B2 | 11/2005 | Pai | |
| 7,007,875 B2 | 3/2006 | Cheng | |
| 7,077,347 B1 | 7/2006 | Wang | |
| 7,380,737 B2 * | 6/2008 | Wang | ...................... 241/169.1 |

(Continued)

FOREIGN PATENT DOCUMENTS

CH    675961 A5    11/1990

(Continued)

OTHER PUBLICATIONS

Notice of Allowance dated Feb. 12, 2008 issued in related U.S. Appl. No. 11/385,807, 8 pages.

(Continued)

*Primary Examiner*—Faye Francis
(74) *Attorney, Agent, or Firm*—Lathrop & Gage LLP

(57) ABSTRACT

An electric seasoning mill includes a body having first and second holding rooms adjacent first and second ends. A motor is housed between the first and second ends. The motor has first and second output shafts extending toward the first and second ends; the first and second output shafts are rotatable in first and second directions. First and second milling assemblies are adjacent the first and second rooms; each milling assembly has stationary and rotatable portions. A first transmission shaft operatively couples the first output shaft and the first milling assembly rotatable portion; a second transmission shaft operatively couples the second output shaft and the second milling assembly rotatable portion. Means are included for automatically actuating the motor to rotate the first output shaft in the first and second directions upon tilting the main body in first and second manners.

20 Claims, 12 Drawing Sheets

U.S. PATENT DOCUMENTS

2003/0052207 A1 3/2003 Wu
2008/0237380 A1* 10/2008 Kalogroulis et al. ..... 241/169.1

FOREIGN PATENT DOCUMENTS

| DE | 20215609 U1 | 10/2002 |
| EP | 0876787 B1 | 11/1998 |
| GB | 256378 | 8/1926 |
| WO | WO 84/00484 | 2/1984 |

OTHER PUBLICATIONS

Complete file history as of Dec. 19, 2007 of related U.S. Appl. No. 11/385,807.
Complete file history as of Dec. 19, 2007 of U.S. Appl. No. 11/637,891 by the same inventor as the current application.
Complete file history as of Dec. 19, 2007 of related U.S. Appl. No. 11/560,209.
Complete file history as of Dec. 19, 2007 of patent U.S. Appl. No. 11/637,891 by the same inventor as the current application.

* cited by examiner

ELECTRIC SEASONING MILL

RELATED APPLICATIONS

The present application is a continuation in part of U.S. patent application Ser. No. 11/385,807, filed Mar. 22, 2006 now U.S. Pat. No. 7,380,737 and titled "ELECTRIC SEASONING MILL", which is incorporated herein by reference.

BACKGROUND

The present invention relates to an electric seasoning mill capable of containing and dispensing two kinds of seasonings.

In order to preserve the original taste of various kinds of seasonings, seasonings are usually stored in larger particle sizes, and ground and directly dispensed with seasoning grinders when people want to use them.

A currently existing manual seasoning mill structure includes a hollow main body, a rotary operating member connected to an upper end of the hollow main body, a transmission shaft held in the main body and turnable together with the rotary operating member, an inner toothed part joined to a lower end of the transmission shaft, and an outer toothed part positioned around the inner toothed part and secured to an inner side of the main body. Seasonings are contained in the hollow main body. Thus, the inner toothed part will turn relative to the outer toothed part to grind seasonings together with the outer toothed part when the operating member is rotated.

However, it requires unwarranted time and labor to use the manual seasoning mill, and it is difficult for those people who can't use their hands very dexterously to operate such seasoning mills smoothly. Further, this prior art seasoning mill can contain only one kind of seasoning or one kind of seasoning combination instead of two.

Various electric seasoning grinders are available such as were disclosed in Patent CH675961A5, DE20215609U1, U.S. Pat. No. 4,685,625, and U.S. Pat. No. 3,734,417. The electric grinders include a motor, a grinding mechanism, a transmission shaft connected to both the motor and the grinding mechanism, and a switch for turning on/off the motor. However, these grinders aren't very practical because they can contain only one kind of seasoning or one kind of seasoning combination.

Although there are several different dual-use seasoning grinders available to consumers which have two separate rooms for containing two kinds of seasonings, and although these can grind the two kinds of seasonings separately (such as were disclosed in Patents/applications US2003/052207 A1, EP0876787A, and GB256378A,) they are hand-operated and not convenient to use.

SUMMARY

An electric seasoning mill according to one embodiment disclosed herein includes a main body, a motor, a power supply unit for powering the motor, first and second milling assemblies, and first and second transmission shafts. The main body has first and second opposed ends, a first holding room adjacent the first end, and a second holding room adjacent the second end. The motor is housed in the main body between the first and second ends. The motor has a first output shaft extending toward the main body first end and a second output shaft extending toward the main body second end. The first and second output shafts are rotatable in concert in a first direction relative to the main body and rotatable in concert in a second direction relative to the main body. The first and second milling assemblies are respectively adjacent the first and second holding rooms; each milling assembly has a stationary portion and a rotatable portion. The first transmission shaft operatively couples the first output shaft and the first milling assembly rotatable portion; the second transmission shaft operatively couples the second output shaft and the second milling assembly rotatable portion. Means are included for automatically actuating the motor to rotate the first and second output shafts in the first direction upon a tilting of the main body so that the first holding room is below the second holding room, and for automatically actuating the motor to rotate the first and second output shafts in the second direction upon a tilting of the main body so that the second holding room is below the first holding room.

An electric seasoning mill according to another embodiment disclosed herein includes a main body, a motor, a power supply unit for powering the motor, first and second milling assemblies, and first and second transmission shafts. The main body has first and second opposed ends, a first holding room adjacent the first end, and a second holding room adjacent the second end. The motor is housed in the main body between the first and second ends. The motor has a first output shaft extending toward the main body first end and a second output shaft extending toward the main body second end. The first and second output shafts are rotatable relative to the main body generally simultaneously; both the first and second output shafts are rotatable in first and second directions relative to the main body. The first and second milling assemblies are respectively adjacent the first and second holding rooms; each milling assembly has a stationary portion and a rotatable portion. The first transmission shaft operatively couples the first output shaft and the first milling assembly rotatable portion; the second transmission shaft operatively couples the second output shaft and the second milling assembly rotatable portion. Means are included for automatically actuating the motor to rotate the first output shaft in the first direction upon a tilting of the main body so that the first holding room is below the second holding room, and for automatically actuating the motor to rotate the first output shaft in the second direction upon a tilting of the main body so that the second holding room is below the first holding room.

An electric seasoning mill according to another embodiment disclosed herein includes a main body, a motor, a power supply unit for powering the motor, first and second milling assemblies, a switch, and first and second transmission shafts. The main body has first and second opposed ends, a first holding room adjacent the first end, and a second holding room adjacent the second end. The motor is housed in the main body between the first and second ends. The motor has a first output shaft extending toward the main body first end and a second output shaft extending toward the main body second end. The first and second output shafts are rotatable relative to the main body generally simultaneously; both the first and second output shafts are rotatable in first and second directions relative to the main body. The first and second milling assemblies are respectively adjacent the first and second holding rooms; each milling assembly has a stationary portion and a rotatable portion. The first transmission shaft operatively couples the first output shaft and the first milling assembly rotatable portion; the second transmission shaft operatively couples the second output shaft and the second milling assembly rotatable portion. The switch has a channel containing at least one movable member. The channel has a first raised region, a second raised region, and a generally flat region connecting the first and second regions. First and second contact points are within the first raised region and biased toward a non-contacting configuration; third and fourth contact points are within the second raised region and biased toward a non-contacting configuration. The at least one movable member is configured to compel contact between the first and second contact points when the main body is tilted so that the first holding room is below the second holding room, and to compel contact between the third and fourth contact points when the main body is tilted so that the second holding room is below the first holding room. Contact between the first and second contact points completes a first circuit and causes the motor to rotate the first output shaft in the first direction; contact between the third and fourth contact points completes a second circuit and causes the motor to rotate the first output shaft in the second direction.

DETAILED DESCRIPTION

Figure 1:
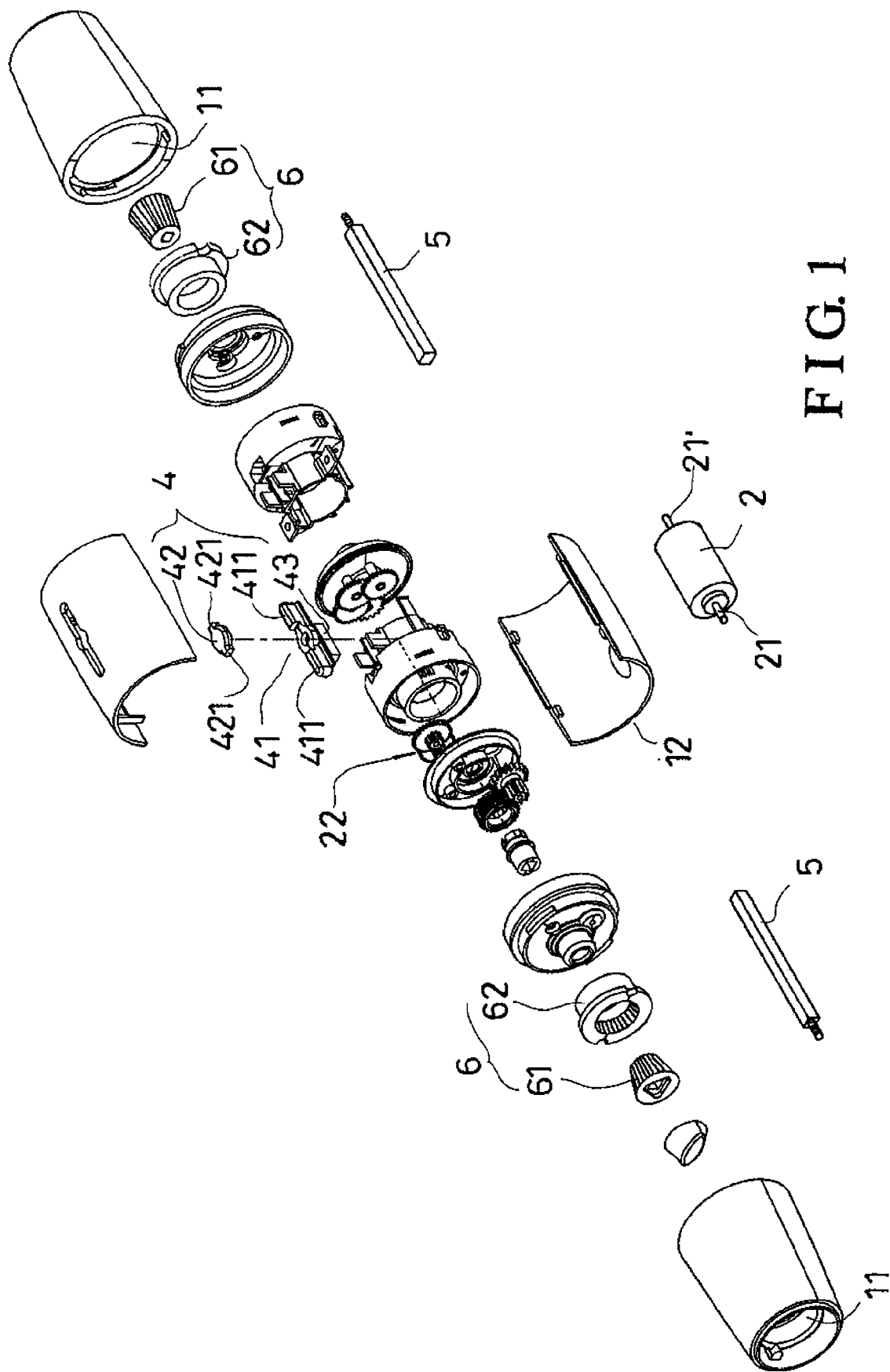
FIG. 1 is an exploded perspective view of a seasoning mill according to an embodiment.
Figure 2:
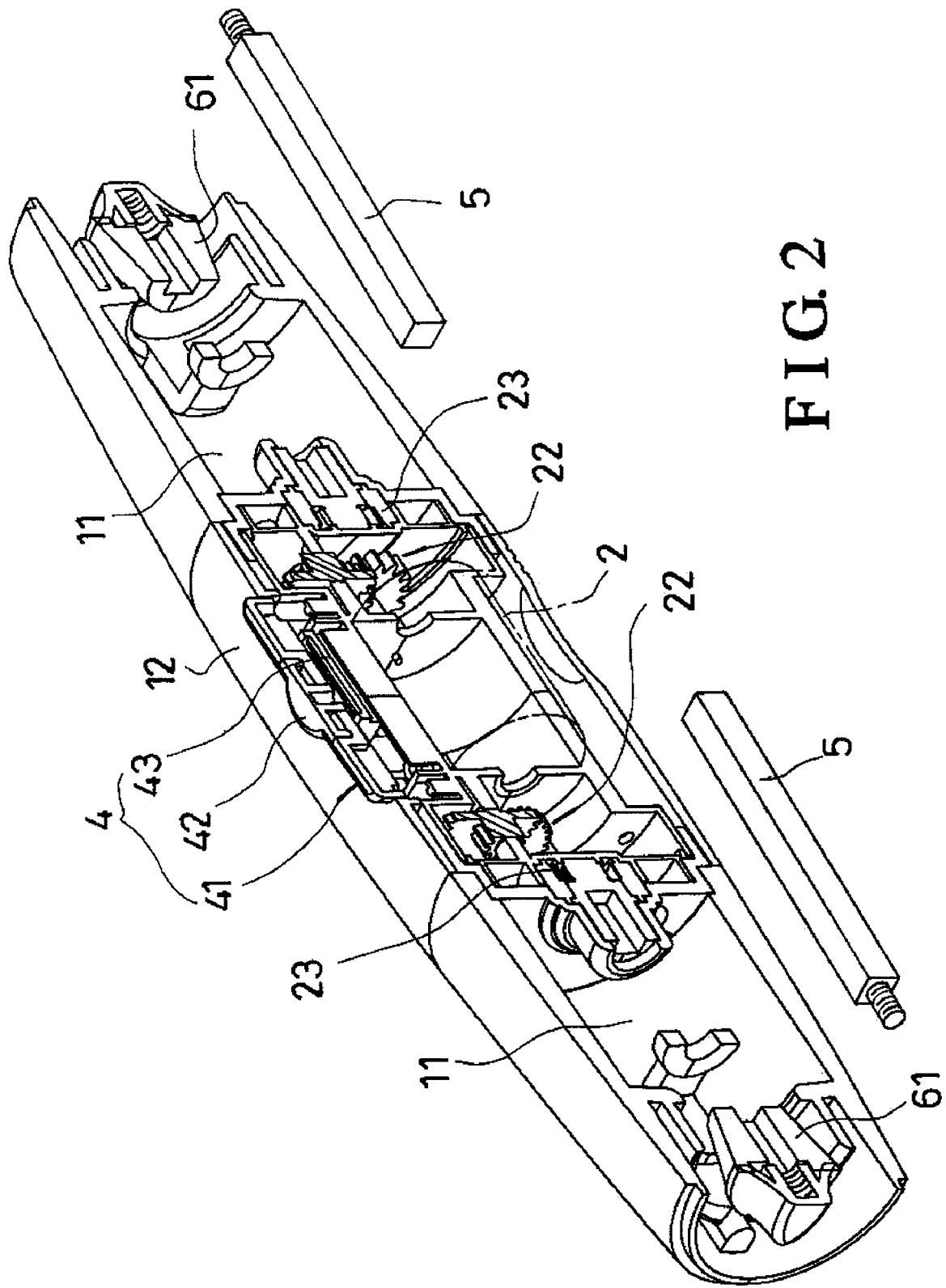
FIG. 2 is a perspective sectional view of the seasoning mill of FIG. 1.
Figure 3:
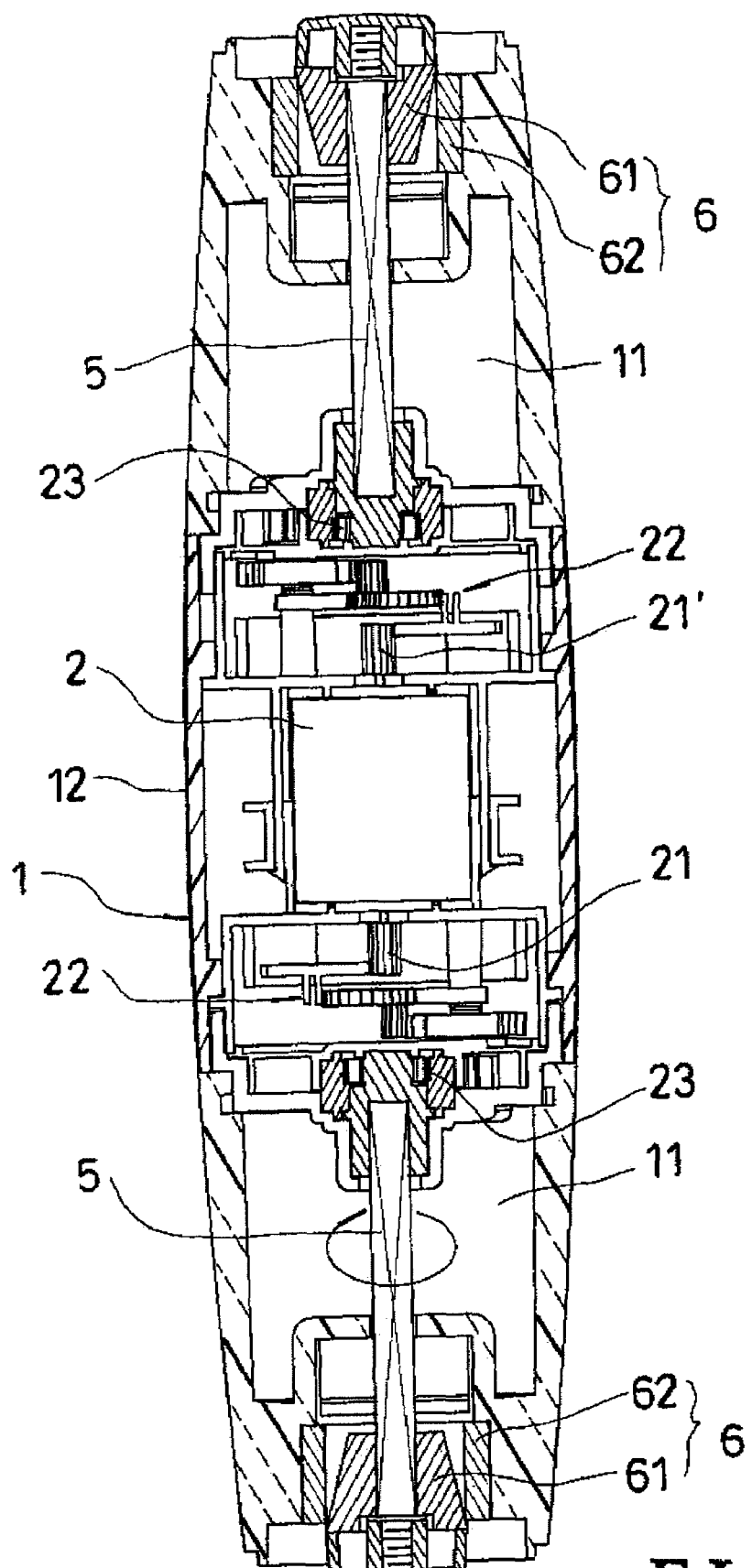
FIG. 3 is a front sectional view of the seasoning mill of FIG. 1.

Referring to FIGS. 1 to 9, an electric seasoning mill 100 according to an embodiment includes a main body 1, a motor 2, a power supply unit 3, a control switch 4, two transmission shafts 5, and first and second milling assemblies 6.

The main body 1 has a holding room 11 in each of two ends thereof for containing seasonings; further, the main body 1 has a connecting section 12 between the holding rooms 11, and a longitudinal guiding rail 13 therein.

The motor 2 is held in the connecting section 12 of the main body 1; the motor 2 has first and second output shafts 21 and 21' at two ends thereof; when the motor 2 is activated, the first and the second output shafts 21 and 21' will always rotate in a same direction, and rotational direction of the output shafts 21 and 21' can be changed. In other words, the output shafts 21 and 21' can rotate in a forward direction and they can rotate in a reverse direction. The output shafts 21 and 21' are each connected to a reduction gear set 22, and the reduction gear sets 22 are each connected to an one-way ratchet 23 at an output parts thereof.

The power supply unit 3 is held in the connecting section 12 of the main body 1 for supplying power to the motor 2.

Figure 4:
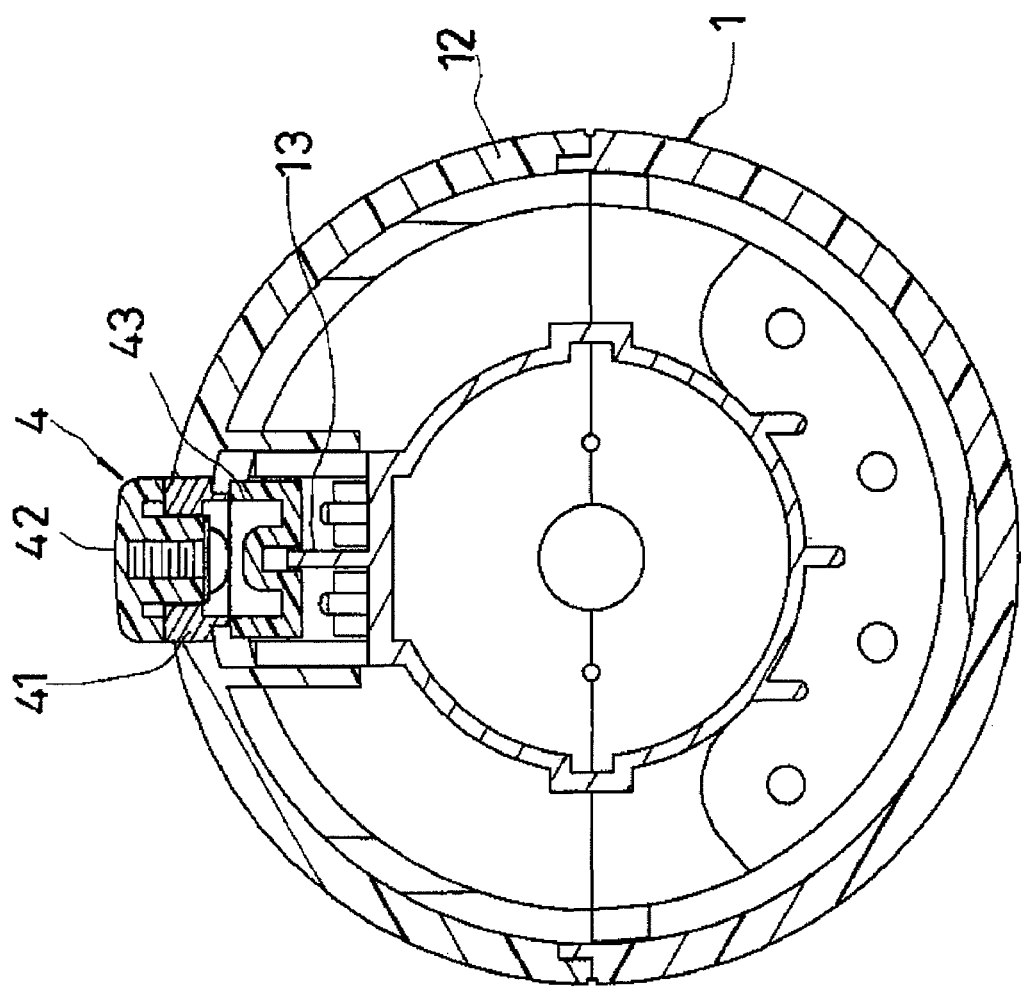
FIG. 4 is a top sectional view of the seasoning mill of FIG. 1.
Figure 5:
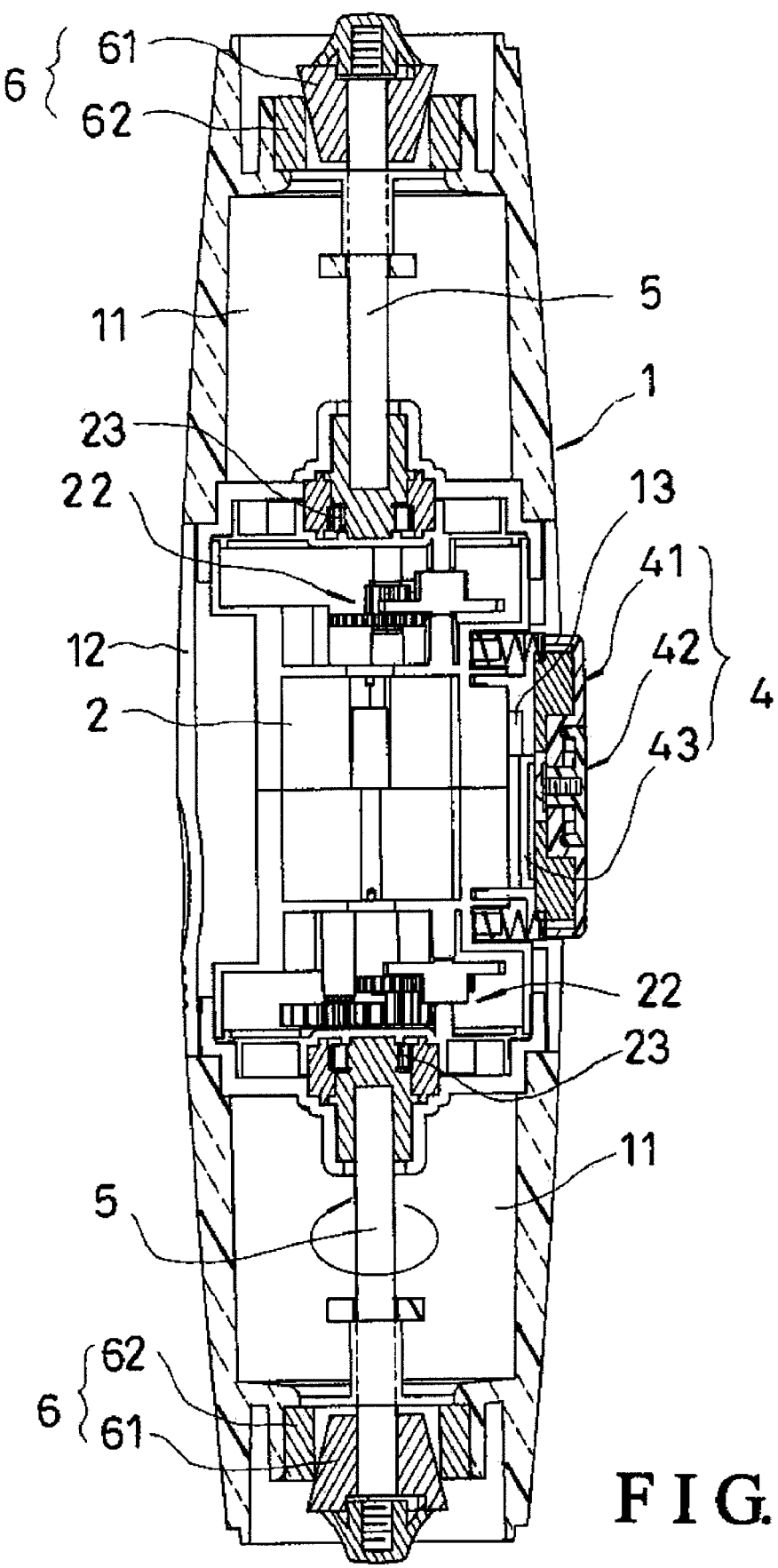
FIG. 5 is a side sectional view of the seasoning mill of FIG. 1.
Figure 6:
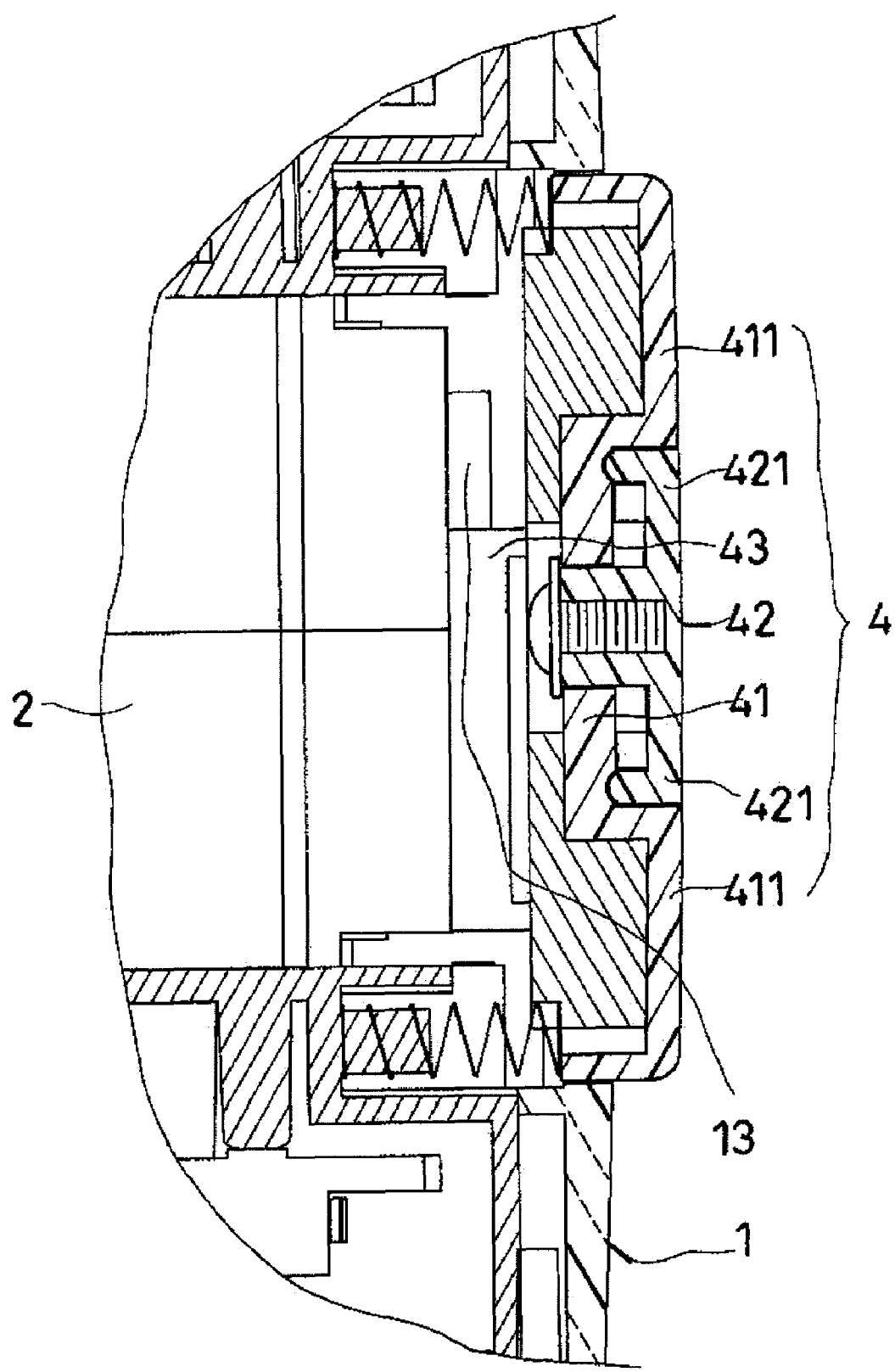
FIG. 6 is a detailed side sectional view of the seasoning mill of FIG. 1.
Figure 7:
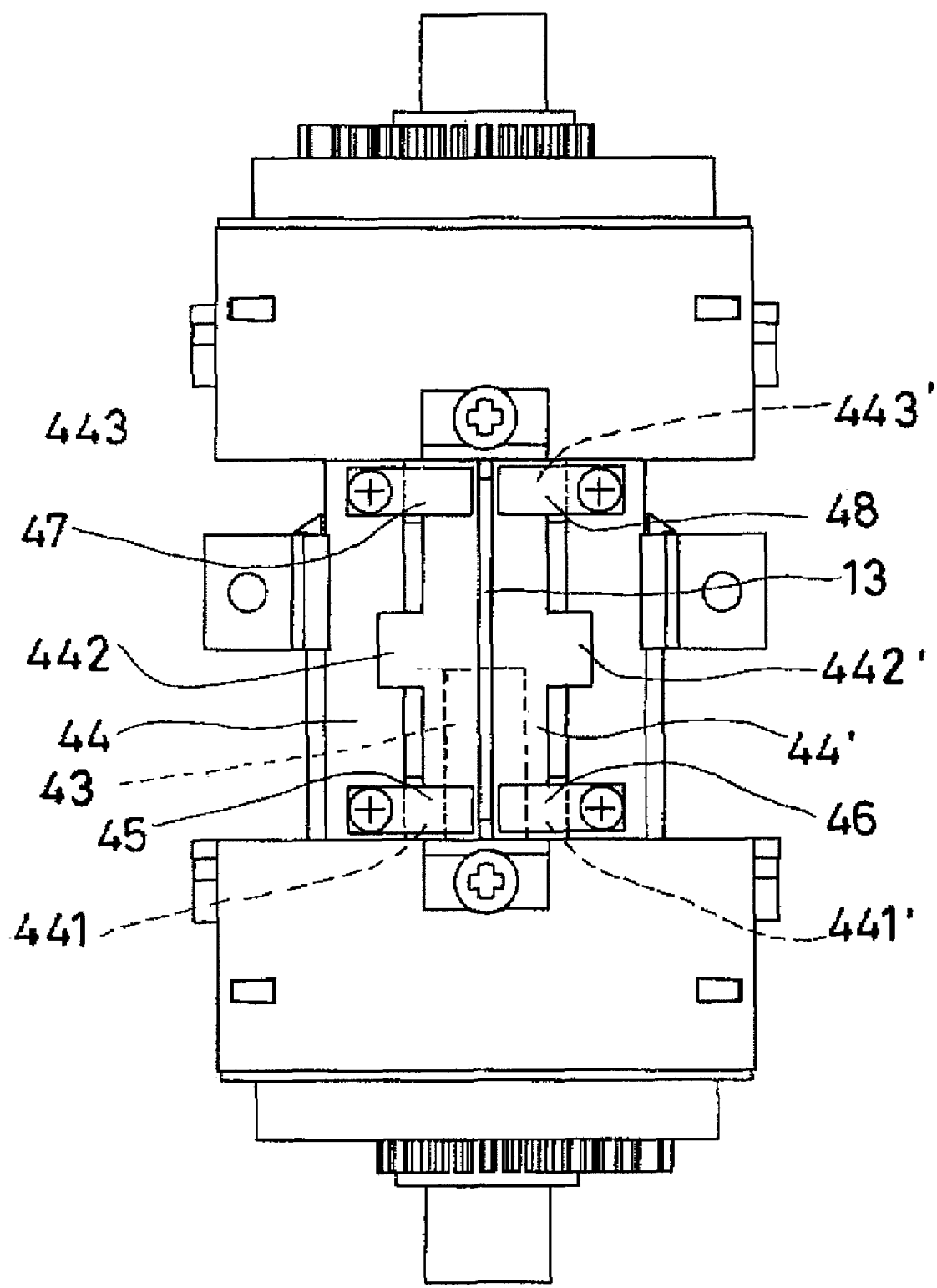
FIG. 7 is a sectional view of a control switch appropriate for use in the seasoning mill of FIG. 1.
Figure 9:
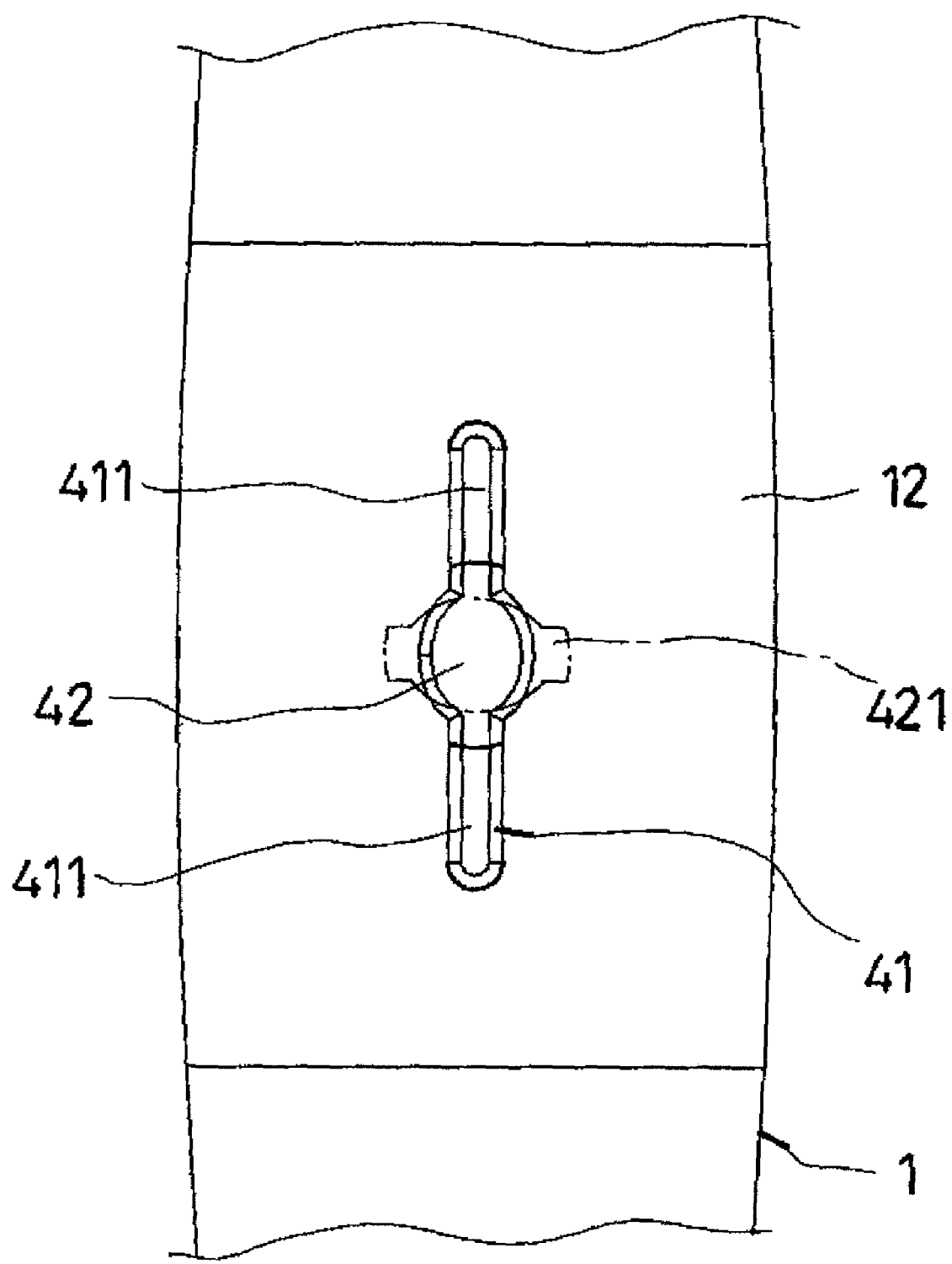
FIG. 9 is a top view of a locking knob appropriate for use in the seasoning mill of FIG. 1.

The control switch 4 is fitted to the connecting section 12 of the main body 1 for controlling supply of power from the power supply unit 3 to the motor 2 as well as for changing the rotational direction of the output shafts 21 and 21' of the motor 2; the control switch 4 includes a button 41, a locking knob 42, a sliding block 43, first and second electricity conducting plates 44 and 44', and first, second, third, and fourth acting plates 45, 46, 47, and 48 (FIG. 7). As best shown in FIG. 9, the button 41 has first and second pressing portions 411 at two ends thereof, which protrudes outside through a wall of the connecting section 12 of the main body 1. The locking knob 42 has two wing portions 421, and it is positioned between the two pressing portions 411 of the button 41, and can be turned so as to be perpendicular to both the pressing portions 411 for locking the button 41, thus preventing the button 41 from being depressed; the button 41 will unlock when the locking knob 42 is parallel to both the pressing portions 411 of the button 41. The sliding block 43 is positioned next to an inner side of the button 41, and fitted on the guiding rail 13 such that the sliding block 43 will slide along the guiding rail 13 when the main body 1 is held with one end thereof being right above the other (FIGS. 4 and 6).

Figure 8:
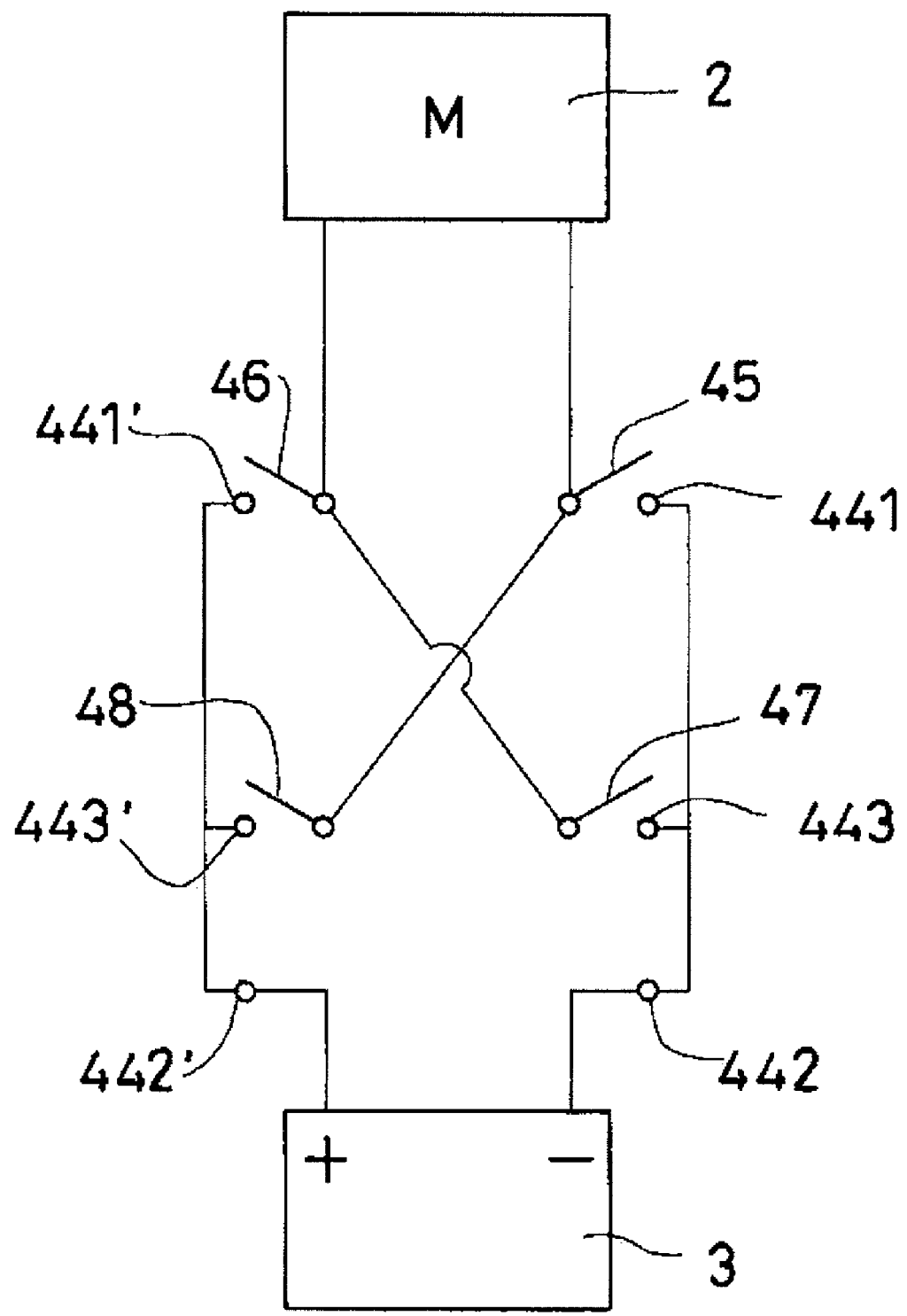
FIG. 8 is a simplified circuit diagram appropriate for use in the seasoning mill of FIG. 1.

As shown in FIGS. 7 and 8, the first electricity conducting plate 44 has a contact point (a) 441, a contact point (b) 442, and a contact point (c) 443, while the second electricity conducting plate 44' has a contact point (a) 441', a contact point (b) 442', and a contact point (c) 443'. The contact point (b) 442 is connected to a negative pole of the power supply unit 3 while the contact point (b) 442' is connected to a positive pole of the power supply unit 3; the first acting plate 45 is constantly connected to both the motor 2 and the fourth acting plate 48, and the second acting plate 46 is constantly connected to both the motor 2 and the third acting plate 47. The wires connecting both the acting plates 45 and 48 cross, and are off the wires connecting both the acting plates 46 and 47. The first acting plate 45 is off and movable to touch the contact point (a) 441 of the first electricity conducting plate 44, the second acting plate 46 is off and movable to touch the contact point (a) 441' of the second electricity conducting plate 44', the third acting plate 47 is off and movable to touch the contact point (c) 443, and the fourth acting plate 48 is off and movable to touch the contact point (c) 443'. Under a normal condition, neither of the pressing portions 411 of the button 41 is depressed.

When the sliding block 43 is near to the inner side of the first pressing portion 411 of the button 41, and the first pressing portion 411 is pressed, the sliding block 43 will press the acting plates 45 and 46 to make the acting plates 45 and 46 get into contact with the contact points (a) 441 and 441' respectively, and the motor 2 will be activated to rotate in a first direction; the motor 2 won't be activated when the second pressing portion 411 of the button 41 is pressed.

On the other hand, when the sliding block 43 is near to the inner side of the second pressing portion 411 of the button 41, and the second pressing portion 411 is pressed, the sliding block 43 will press the acting plates 47 and 48 to make the acting plates 47 and 48 get into contact with the contact points (c) 443 and 443' respectively, and the motor 2 will be activated to rotate in a reverse direction opposite to the first one.

The first and the second milling assemblies 6 are held in respective ones of the holding rooms 11 of the main body 1, positioned near to the openings of the holding rooms 11. Each of the milling assemblies 6 includes an inner toothed part 61, and an outer toothed part 62, which is positioned around the inner toothed part 61 and secured to the main body 1, near to the opening of the corresponding holding room 11.

The transmission shafts 5 are each held in a respective one of the holding rooms 11, and connected to a respective one of the one-way ratchets 23 at one end such that it will be turned with the one-way ratchet 23 only when the one-way ratchet 23 is turned in a certain predetermined direction; further, the transmission shafts 5 are each connected to a respective one of the inner toothed parts 61 of the milling assemblies 6 at the other end.

Therefore, when the seasoning mill 100 is held with the first output shaft 21 and the corresponding first milling assembly 6 being right under the second output shaft 21' and the second output shaft's corresponding second milling assembly 6 so as to allow the sliding block 43 to slide down along the guiding rail 13 owing to gravity, and when a currently lower one of the pressing portions 411 of the button 41 is pressed, the acting plates 45 and 46 will get into contact with the contact points (a) 441 and 441' respectively, and the motor 2 will start rotating in the first direction for allowing the one-way ratchet 23 connected to the first output shaft 21 to rotate and cause the corresponding transmission shaft 5 to rotate together with it. Thus, the inner toothed part 61 of the first milling assembly 6, which is currently in the lower position, will rotate to grind seasonings together with the outer toothed part 62. On the other hand, the one-way ratchet 23 connected to the second output shaft 21' (currently in the upper position) will rotate, but it won't cause the corresponding transmission shaft 5 to rotate together with it; thus, the second milling assembly 6 (currently in the upper position) won't work. The sliding block 43 will be off the acting plates 45 and 46, and the motor 2 will stop rotating when the user stops pressing the button 41. And, because the sliding block 43 has slid down along the guiding rail 13 to be apart from the second pressing portion 411 of the button 41, the motor 2 won't be activated when the mill is held in the above-mentioned position, and the second pressing portion 411 is pressed.

When the seasoning mill is held in an inverted position, in which position the second output shaft 21' and the corresponding second milling assembly 6 are right under the first output shaft 21 so as to allow the sliding block 43 to slide down along the guiding rail 13 owing to gravity, and when a currently lower one of the pressing portions 411 of the button 41 is pressed, the acting plates 47 and 48 will get into contact with the contact points (c) 443 and 443' respectively, and the motor 2 will start rotating in the reverse direction opposite to the first one for allowing the one-way ratchet 23 connected to the second output shaft 21' to rotate and cause the corresponding transmission shaft 5 to rotate together with it. Thus, the inner toothed part 61 of the second milling assembly 6 (currently in the lower position) will rotate to grind seasonings together with the outer toothed part 62. On the other hand, the one-way ratchet 23 connected to the first output shaft 21 (currently in the upper position) will rotate, but it can't cause the corresponding transmission shaft 5 to rotate together with it; thus, the first milling assembly 6 (currently in the upper position) won't work. The sliding block 43 will be off the acting plates 47 and 48, and the motor 2 will stop rotating when the user stops pressing the button 41. And, the motor 2 won't be activated when the first pressing portion 411 of the button 41 is pressed with the mill being held in the above-mentioned position.

Furthermore, when the locking knob 42 is turned to such a position that the wing portions 421 are perpendicular to the pressing portions 411 of the button 41, and right on an outer side of the main body 1, as shown in FIG. 9, the locking knob 42 will prevent the button 41 from being depressed, thus preventing the motor 2 from being accidentally activated.

From the above description, it can be easily seen that the electric seasoning mill 100 has two milling assemblies 6 and two holding rooms 11 for containing two kinds of seasonings or two kinds of seasoning combinations, and only a currently lower one of the milling assemblies 6 will work to grind seasonings contained in the currently lower holding room 11 no matter in which one of the upright and the inverted positions the seasoning mill 100 is held. Therefore, the seasoning mill 100 is relatively convenient to use. Furthermore, the electric seasoning mill 100 can be prevented from being accidentally activated by means of turning the locking knob 42 to such a position as to lock the button 41 of the control switch 4; therefore the seasoning mill 100 is relatively safe to use.

Figure 10:
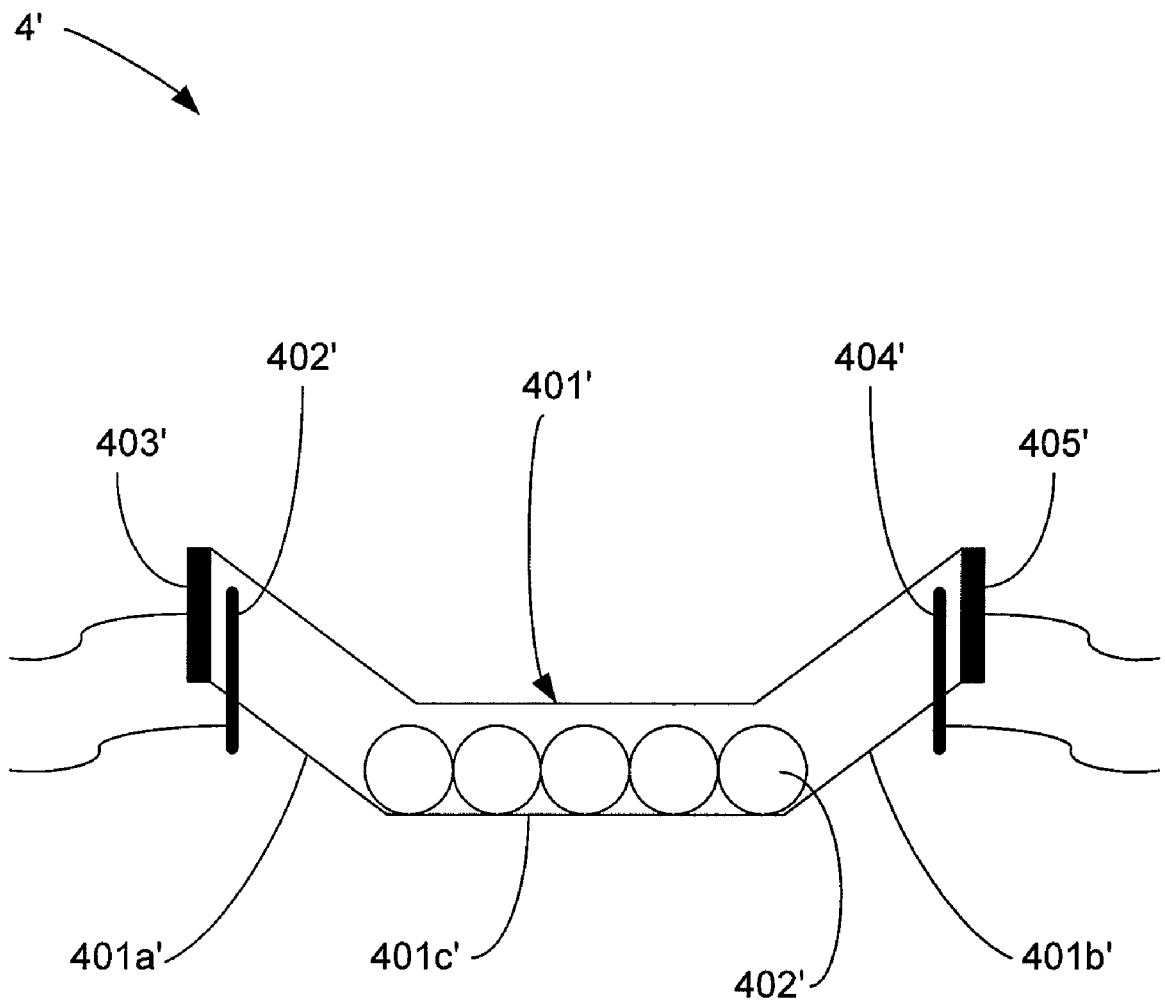
FIG. 10 is a front sectional view of another control switch appropriate for use in the seasoning mill of FIG. 1, the control switch being in a generally horizontal configuration.
Figure 11:
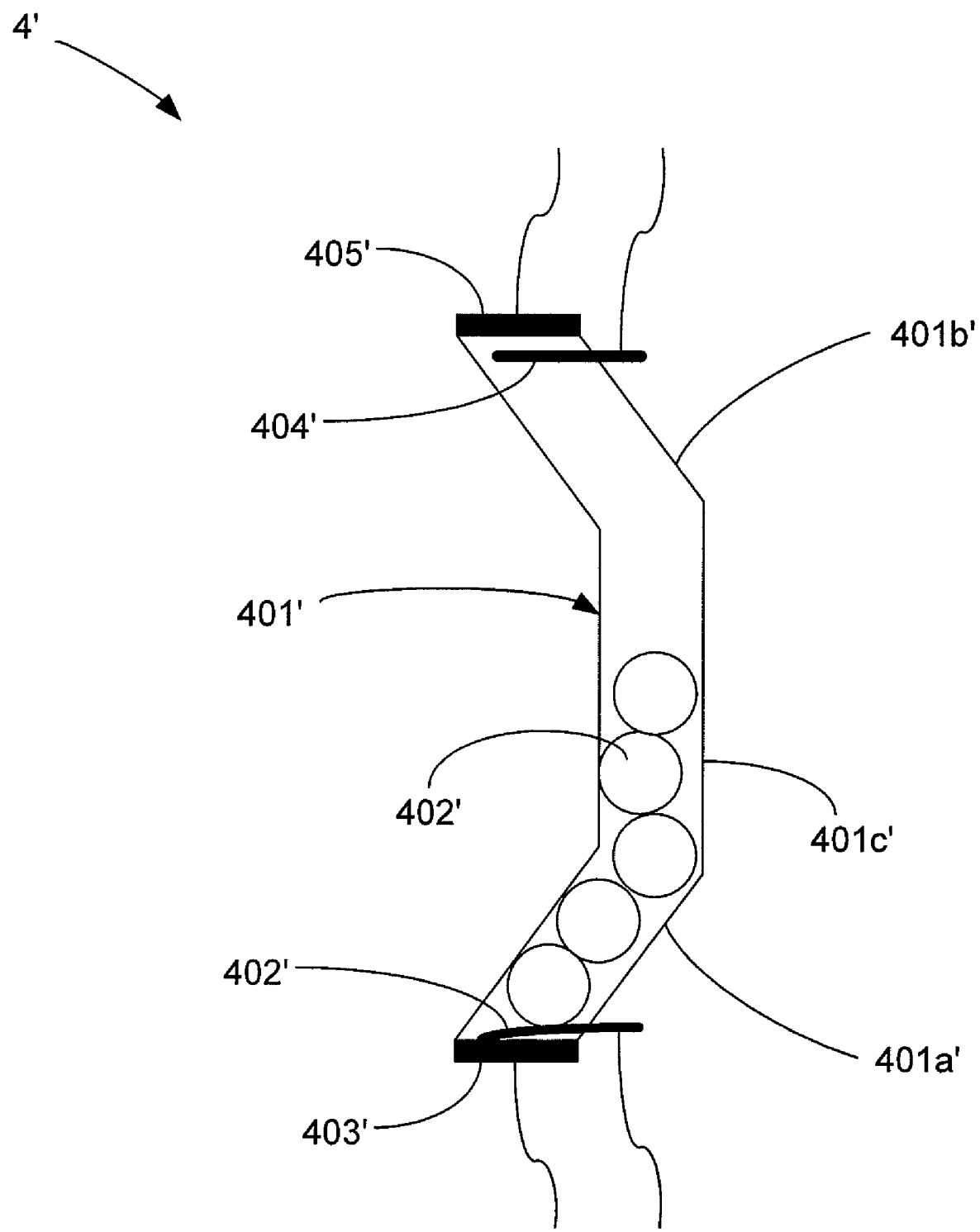
FIG. 11 is a front sectional view of the control switch of FIG. 10, the control switch being in a generally vertical configuration.

FIGS. 10 and 11 show an alternate switch 4' that may be used in the seasoning mill 100 instead of (or in addition to) the switch 4 described above. The alternate switch 4' includes a channel 401' containing at least one movable member 402'. While five spherical balls are shown as movable members 402', more or fewer balls may be used, and/or non-spherical members may be used. The channel 401' includes a first raised region 401a', a second raised region 401b', and a generally flat region 401c' connecting the first and second regions 401a', 401b'. The flat region 401c' may be generally parallel to the transmission shafts 5, for example. First and second contact points 402', 403' are located within the first region 401a', and third and fourth contact points 404', 405' are located within the second region 401b'.

When the switch 4' is at a horizontal configuration as shown in FIG. 10 (e.g., when neither of the milling assemblies 6 is below the other milling assembly 6,) the movable member(s) 402' are located in the flat region 401c' due to gravity. While the movable member(s) 402' are located in the flat region 401c', the first and second contact points 402', 403' do not contact each other, and the third and fourth contact points 404', 405' do not contact each other; the motor 2 remains inactivated, and neither milling assembly 6 rotates.

When the switch 4' is at a vertical configuration as shown in FIG. 11 (e.g., when one of the milling assemblies 6 is below the other milling assembly 6,) the movable member(s) 402' are located in the first raised region 401a' or the second raised region 401b' due to gravity. When the movable member(s) 402' are located in the first or second raised region 401a', 401b', the movable member(s) 402' force the first contact point 402' to contact the second contact point 403' or the third contact point 404' to contact the fourth contact point 405', respectively. As illustration, FIG. 11 shows the movable member(s) 402' in the first raised region 401a', causing the first contact point 402' to contact the second contact point 403'.

Contact between the first and second contact points 402', 403' completes an electrical circuit and causes the motor 2 to rotate in one direction as described above. Contact between the third and fourth contact points 404', 405' completes another electrical circuit and causes the motor 2 to rotate in another direction as described above. As such, the motor 2 may be automatically actuated and a respective milling assembly 6 may be utilized simply by holding the main body 1 in a non-horizontal manner. It should be understood that the amount of angle between the first raised region 401a' and the flat region 401c' and between the second raised region 401b' and the flat region 401c' can be altered to affect the amount of tilt required to contact the respective contact point 402', 404' with the movable member(s) 402'.

Figure 12:
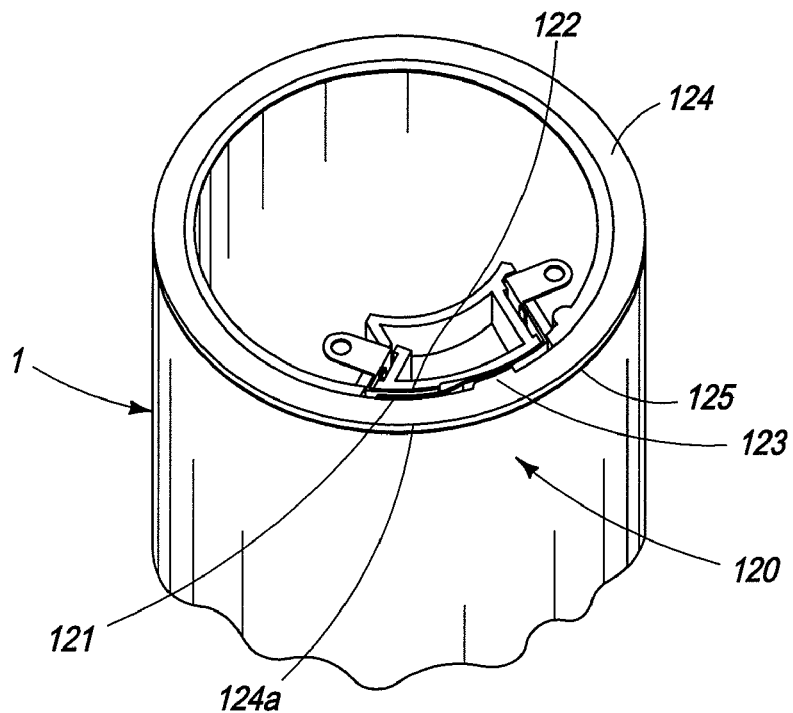
FIG. 12 is a partial perspective view of a switch appropriate for use in the seasoning mill of FIG. 1, the switch being shown in one configuration.
Figure 13:
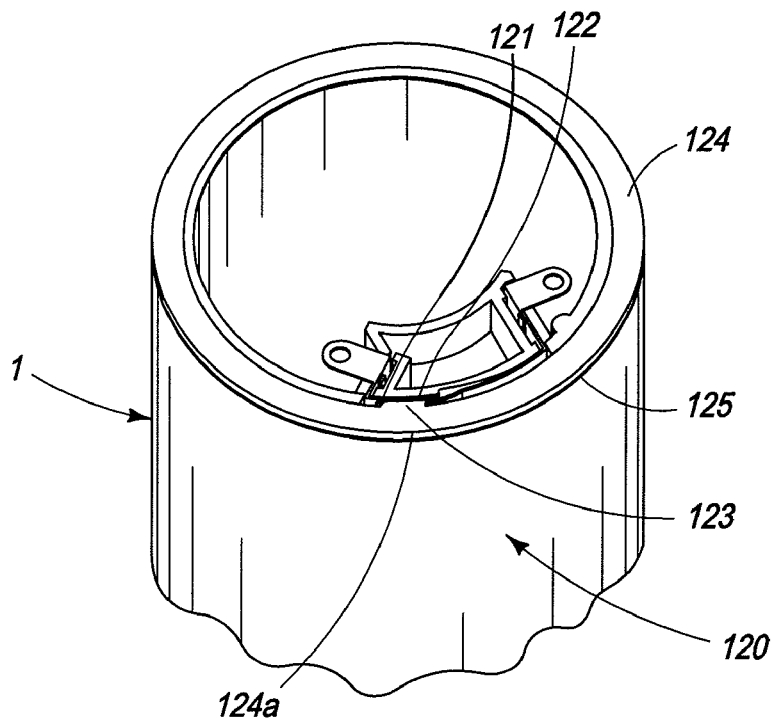
FIG. 13 is a partial perspective view of the switch of FIG. 12, the switch being shown in another configuration.

FIGS. 12 and 13 show a switch 120 that may be used in addition to (or instead of) the switch 4' described above in relation to FIGS. 10 and 11 or to the switch 4 described above. The switch 120 selectively completes an electrical circuit or at least a portion of an electrical circuit, allowing the motor 2 to rotate as described above. More particularly, when the electrical circuit incorporating the switch 120 is not completed (FIG. 12), the motor 2 may not be actuated; when the electrical circuit incorporating the switch 120 is completed (FIG. 13), the motor 2 may be actuated as long as any additional switch (e.g., the switch 4' or the switch 4) is activated.

The switch 120 includes first and second contact members 121, 122 and a driving member 123. The first and second contact members 121, 122 are biased so that the first and second contact members 121, 122 are not typically in contact, as shown in FIG. 12. The driving member 123 may selectively force the first contact member 121 to contact the second contact member 122, as shown in FIG. 13. When the first and second members 121, 122 are not in contact, the electrical circuit or the portion of the electrical circuit is not completed. When the first and second members 121, 122 are in contact, the electrical circuit or the portion of the electrical circuit is completed.

As shown in FIGS. 12 and 13, the driving member 123 may have a coupling portion 124 that is seated in a groove 125 defined by the main body 1. The groove 125 may extend completely around the main body 1 as shown, or the groove 125 may alternately extend around only a portion of the main body 1. An outer wall 124a of the coupling portion 124 may be accessed by a user to selectively move the driving member 123 as discussed above. While a specific driving member 123 has been shown and discussed, it should be understood that the driving member 123 may be configured differently to selectively force contact between the first and second contact members 121, 122 and that such is contemplated herein.

Those skilled in the art appreciate that variations from the specified embodiments disclosed above are contemplated herein. The description should not be restricted to the above embodiments, but should be measured by the following claims.

What is claimed is:

1. An electric seasoning mill, comprising:
a main body having first and second opposed ends, a first holding room adjacent the main body first end, and a second holding room adjacent the main body second end;
a motor housed in the main body between the main body first and second ends, the motor having a first output shaft extending toward the main body first end and a second output shaft extending toward the main body second end, the first and second output shafts being rotatable in concert in a first direction relative to the main body, the first and second output shafts being rotatable in concert in a second direction relative to the main body;
a power supply unit for powering the motor;
means for automatically actuating the motor to rotate the first and second output shafts in the first direction upon a tilting of the main body so that the first holding room is below the second holding room, and for automatically actuating the motor to rotate the first and second output shafts in the second direction upon a tilting of the main body so that the second holding room is below the first holding room;
first and second milling assemblies respectively adjacent the first and second holding rooms, each milling assembly having a stationary portion and a rotatable portion;
a first transmission shaft operatively coupling the first output shaft and the first milling assembly rotatable portion; and
a second transmission shaft operatively coupling the second output shaft and the second milling assembly rotatable portion;
wherein the means for automatically actuating includes a switch having a channel containing at least one movable member;
wherein the channel has a first raised region, a second raised region, and a generally flat region connecting the first and second regions;
wherein first and second contact points are within the first raised region and biased toward a non-contacting configuration;
wherein third and fourth contact points are within the second raised region and biased toward a non-contacting configuration;
wherein the at least one movable member is configured to compel contact between the first and second contact points when the main body is tilted so that the first holding room is below the second holding room, and to compel contact between the third and fourth contact points when the main body is tilted so that the second holding room is below the first holding room;
wherein contact between the first and second contact points completes a first circuit and causes the motor to rotate the first and second output shafts in the first direction; and
wherein contact between the third and fourth contact points completes a second circuit and causes the motor to rotate the first and second output shafts in the second direction.

2. The electric seasoning mill of claim 1, further comprising:
a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and
a second one-way ratchet operatively coupled to the second output shaft and the second transmission shaft, the second ratchet rotating the second transmission shaft when the second output shaft is rotated in the second direction, the second ratchet not rotating the second transmission shaft when the second output shaft is rotated in the first direction.

3. The electric seasoning mill of claim 2, wherein:
a first reduction gear set is coupled to the first ratchet and at least one of the first output shaft and the first transmission shaft for reducing a speed of rotation of the first transmission shaft relative to the first output shaft; and
a second reduction gear set is coupled to the second ratchet and at least one of the second output shaft and the second transmission shaft for reducing a speed of rotation of the second transmission shaft relative to the second output shaft.

4. An electric seasoning mill, comprising:
a main body having first and second opposed ends, a first holding room adjacent the main body first end, and a second holding room adjacent the main body second end;
a motor housed in the main body between the main body first and second ends, the motor having a first output shaft extending toward the main body first end and a second output shaft extending toward the main body second end, the first and second output shafts being rotatable in concert in a first direction relative to the main body, the first and second output shafts being rotatable in concert in a second direction relative to the main body;

a power supply unit for powering the motor;

means for automatically actuating the motor to rotate the first and second output shafts in the first direction upon a tilting of the main body so that the first holding room is below the second holding room, and for automatically actuating the motor to rotate the first and second output shafts in the second direction upon a tilting of the main body so that the second holding room is below the first holding room;

first and second milling assemblies respectively adjacent the first and second holding rooms, each milling assembly having a stationary portion and a rotatable portion;

a first transmission shaft operatively coupling the first output shaft and the first milling assembly rotatable portion;

a second transmission shaft operatively coupling the second output shaft and the second milling assembly rotatable portion;

a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and a second one-way ratchet operatively coupled to the second output shaft and the second transmission shaft, the second ratchet rotating the second transmission shaft when the second output shaft is rotated in the second direction, the second ratchet not rotating the second transmission shaft when the second output shaft is rotated in the first direction.

5. The electric seasoning mill of claim 4, wherein:

a first reduction gear set is coupled to the first ratchet and at least one of the first output shaft and the first transmission shaft for reducing a speed of rotation of the first transmission shaft relative to the first output shaft; and a second reduction gear set is coupled to the second ratchet and at least one of the second output shaft and the second transmission shaft for reducing a speed of rotation of the second transmission shaft relative to the second output shaft.

6. The electric seasoning mill of claim 4, wherein:

the first holding room includes an opening and the first milling assembly is housed in the first holding room adjacent the first holding room opening; and the second holding room includes an opening and the second milling assembly is housed in the second holding room adjacent the second holding room opening.

7. The electric seasoning mill of claim 6, wherein:

each respective milling assembly rotatable portion includes an interior part having teeth extending outwardly therefrom;

each respective milling assembly stationary portion includes an outer part having teeth extending inwardly therefrom, each outer part being positioned around a respective interior part; and the teeth extending inwardly from each outer part have a configuration complementary to a configuration of the teeth extending outwardly from a respective interior part.

8. An electric seasoning mill, comprising:

a main body having first and second opposed ends, a first holding room adjacent the main body first end, and a second holding room adjacent the main body second end;

a motor housed in the main body between the main body first and second ends, the motor having a first output shaft extending toward the main body first end and a second output shaft extending toward the main body second end, the first and second output shafts being rotatable in concert in a first direction relative to the main body, the first and second output shafts being rotatable in concert in a second direction relative to the main body;

a power supply unit for powering the motor;

means for automatically actuating the motor to rotate the first and second output shafts in the first direction upon a tilting of the main body so that the first holding room is below the second holding room, and for automatically actuating the motor to rotate the first and second output shafts in the second direction upon a tilting of the main body so that the second holding room is below the first holding room;

first and second milling assemblies respectively adjacent the first and second holding rooms, each milling assembly having a stationary portion and a rotatable portion;

a first transmission shaft operatively coupling the first output shaft and the first milling assembly rotatable portion;

a second transmission shaft operatively coupling the second output shaft and the second milling assembly rotatable portion; and a switch for selectively completing at least a portion of an electrical circuit;

wherein the switch has first and second contact members and a driving member;

wherein the first and second contact members are biased so that the first and second contact members are not typically in contact;

wherein the driving member is movable between a first configuration causing contact between the first and second contact members to complete the at least a portion of the electrical circuit and a second configuration allowing separation between the first and second contact members to not complete the at least a portion of the electrical circuit;

wherein the motor can be actuated when the driving member is at the first configuration; and wherein the motor cannot be actuated when the driving member is at the second configuration.

9. The electric seasoning mill of claim 8, wherein:

the main body defines a groove extending completely therearound;

the driving member has a coupling portion seated in the groove; and the driving member coupling portion has an outer wall being accessible to selectively move the driving member between the first and second configurations.

10. An electric seasoning mill, comprising:

a main body having first and second opposed ends, a first holding room adjacent the main body first end, and a second holding room adjacent the main body second end;

a motor housed in the main body between the main body first and second ends, the motor having a first output shaft extending toward the main body first end and a second output shaft extending toward the main body second end, the first and second output shafts being rotatable together relative to the main body, both the first and second output shafts being rotatable in first and second directions relative to the main body;

a power supply unit for powering the motor;

means for automatically actuating the motor to rotate the first output shaft in the first direction upon a tilting of the main body so that the first holding room is below the second holding room, and for automatically actuating the motor to rotate the first output shaft in the second direction upon a tilting of the main body so that the second holding room is below the first holding room;

first and second milling assemblies respectively adjacent the first and second holding rooms, each milling assembly having a stationary portion and a rotatable portion;

a first transmission shaft operatively coupling the first output shaft and the first milling assembly rotatable portion; and a second transmission shaft operatively coupling the second output shaft and the second milling assembly rotatable portion;

wherein the means for automatically actuating includes a switch having a channel containing at least one movable member;

wherein the channel has a first raised region, a second raised region, and a generally flat region connecting the first and second regions;

wherein first and second contact points are within the first raised region and biased toward a non-contacting configuration;

wherein third and fourth contact points are within the second raised region and biased toward a non-contacting configuration;

wherein the at least one movable member is configured to compel contact between the first and second contact points when the main body is tilted so that the first holding room is below the second holding room, and to compel contact between the third and fourth contact points when the main body is tilted so that the second holding room is below the first holding room;

wherein contact between the first and second contact points completes a first circuit and causes the motor to rotate the first output shaft in the first direction; and wherein contact between the third and fourth contact points completes a second circuit and causes the motor to rotate the first output shaft in the second direction.

11. The electric seasoning mill of claim 10, further comprising:

a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and a second one-way ratchet operatively coupled to the second output shaft and the second transmission shaft, the second ratchet rotating the second transmission shaft when the second output shaft is rotated in the second direction, the second ratchet not rotating the second transmission shaft when the second output shaft is rotated in the first direction.

12. The electric seasoning mill of claim 11, wherein:

a first reduction gear set is coupled to the first ratchet and at least one of the first output shaft and the first transmission shaft for reducing a speed of rotation of the first transmission shaft relative to the first output shaft; and a second reduction gear set is coupled to the second ratchet and at least one of the second output shaft and the second transmission shaft for reducing a speed of rotation of the second transmission shaft relative to the second output shaft.

13. An electric seasoning mill, comprising:

a main body having first and second opposed ends, a first holding room adjacent the main body first end, and a second holding room adjacent the main body second end;

a motor housed in the main body between the main body first and second ends, the motor having a first output shaft extending toward the main body first end and a second output shaft extending toward the main body second end, the first and second output shafts being rotatable together relative to the main body, both the first and second output shafts being rotatable in first and second directions relative to the main body;

a power supply unit for powering the motor;

means for automatically actuating the motor to rotate the first output shaft in the first direction upon a tilting of the main body so that the first holding room is below the second holding room, and for automatically actuating the motor to rotate the first output shaft in the second direction upon a tilting of the main body so that the second holding room is below the first holding room;

first and second milling assemblies respectively adjacent the first and second holding rooms, each milling assembly having a stationary portion and a rotatable portion;

a first transmission shaft operatively coupling the first output shaft and the first milling assembly rotatable portion;

a second transmission shaft operatively coupling the second output shaft and the second milling assembly rotatable portion;

a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and a second one-way ratchet operatively coupled to the second output shaft and the second transmission shaft, the second ratchet rotating the second transmission shaft when the second output shaft is rotated in the second direction, the second ratchet not rotating the second transmission shaft when the second output shaft is rotated in the first direction.

14. The electric seasoning mill of claim 13, wherein:

a first reduction gear set is coupled to the first ratchet and at least one of the first output shaft and the first transmission shaft for reducing a speed of rotation of the first transmission shaft relative to the first output shaft; and a second reduction gear set is coupled to the second ratchet and at least one of the second output shaft and the second transmission shaft for reducing a speed of rotation of the second transmission shaft relative to the second output shaft.

15. An electric seasoning mill, comprising:

a main body having first and second opposed ends, a first holding room adjacent the main body first end, and a second holding room adjacent the main body second end;

a motor housed in the main body between the main body first and second ends, the motor having a first output shaft extending toward the main body first end and a second output shaft extending toward the main body second end, the first and second output shafts being rotatable together relative to the main body, both the first and second output shafts being rotatable in first and second directions relative to the main body;
a power supply unit for powering the motor;
means for automatically actuating the motor to rotate the first output shaft in the first direction upon a tilting of the main body so that the first holding room is below the second holding room, and for automatically actuating the motor to rotate the first output shaft in the second direction upon a tilting of the main body so that the second holding room is below the first holding room;
first and second milling assemblies respectively adjacent the first and second holding rooms, each milling assembly having a stationary portion and a rotatable portion;
a first transmission shaft operatively coupling the first output shaft and the first milling assembly rotatable portion;
a second transmission shaft operatively coupling the second output shaft and the second milling assembly rotatable portion; and
a switch for selectively completing at least a portion of an electrical circuit;
wherein the switch has first and second contact members and a driving member;
wherein the first and second contact members are biased so that the first and second contact members are not typically in contact;
wherein the driving member is movable between a first configuration causing contact between the first and second contact members to complete the at least a portion of the electrical circuit and a second configuration allowing separation between the first and second contact members to not complete the at least a portion of the electrical circuit;
wherein the motor can be actuated when the driving member is at the first configuration; and
wherein the motor cannot be actuated when the driving member is at the second configuration.

16. An electric seasoning mill, comprising:
a main body having first and second opposed ends, a first holding room adjacent the main body first end, and a second holding room adjacent the main body second end;
a motor housed in the main body between the main body first and second ends, the motor having a first output shaft extending toward the main body first end and a second output shaft extending toward the main body second end, the first and second output shafts being rotatable together relative to the main body, both the first and second output shafts being rotatable in first and second directions relative to the main body;
a power supply unit for powering the motor;
a switch having a channel containing at least one movable member, the channel having a first raised region, a second raised region, and a generally flat region connecting the first and second regions;
first and second contact points within the first raised region and being biased toward a non-contacting configuration;
third and fourth contact points within the second raised region and being biased toward a non-contacting configuration;
first and second milling assemblies respectively adjacent the first and second holding rooms, each milling assembly having a stationary portion and a rotatable portion;
a first transmission shaft operatively coupling the first output shaft and the first milling assembly rotatable portion;
a second transmission shaft operatively coupling the second output shaft and the second milling assembly rotatable portion;
wherein the at least one movable member is configured to compel contact between the first and second contact points when the main body is tilted so that the first holding room is below the second holding room, and to compel contact between the third and fourth contact points when the main body is tilted so that the second holding room is below the first holding room;
wherein contact between the first and second contact points completes a first circuit and causes the motor to rotate the first output shaft in the first direction; and
wherein contact between the third and fourth contact points completes a second circuit and causes the motor to rotate the first output shaft in the second direction.

17. The electric seasoning mill of claim 16, further comprising:
a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and
a second one-way ratchet operatively coupled to the second output shaft and the second transmission shaft, the second ratchet rotating the second transmission shaft when the second output shaft is rotated in the second direction, the second ratchet not rotating the second transmission shaft when the second output shaft is rotated in the first direction.

18. The electric seasoning mill of claim 17, wherein:
a first reduction gear set is coupled to the first ratchet and at least one of the first output shaft and the first transmission shaft for reducing a speed of rotation of the first transmission shaft relative to the first output shaft; and
a second reduction gear set is coupled to the second ratchet and at least one of the second output shaft and the second transmission shaft for reducing a speed of rotation of the second transmission shaft relative to the second output shaft.

19. The electric seasoning mill of claim 16, wherein the at least one movable member has at least one spherical configuration.

20. An electric seasoning mill, comprising:
a main body having first and second opposed ends, a first holding room adjacent the main body first end, and a second holding room adjacent the main body second end;
a motor housed in the main body between the main body first and second ends, the motor having a first output shaft extending toward the main body first end and a second output shaft extending toward the main body second end, the first and second output shafts being rotatable in concert in a first direction relative to the main body, the first and second output shafts being rotatable in concert in a second direction relative to the main body;
a power supply unit for powering the motor;
at least one switch to automatically actuate the motor to rotate the first and second output shafts in the first direction upon a tilting of the main body so that the first holding room is below the second holding room, and to automatically actuate the motor to rotate the first and second output shafts in the second direction upon a tilting of the main body so that the second holding room is below the first holding room;
first and second milling assemblies respectively adjacent the first and second holding rooms, each milling assembly having a stationary portion and a rotatable portion;

a first transmission shaft operatively coupling the first output shaft and the first milling assembly rotatable portion;
a second transmission shaft operatively coupling the second output shaft and the second milling assembly rotatable portion;
a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and
a second one-way ratchet operatively coupled to the second output shaft and the second transmission shaft, the second ratchet rotating the second transmission shaft when the second output shaft is rotated in the second direction, the second ratchet not rotating the second transmission shaft when the second output shaft is rotated in the first direction.

* * * * *